United States Patent
O'Toole, Jr. et al.

(10) Patent No.: US 7,508,941 B1
(45) Date of Patent: Mar. 24, 2009

(54) METHODS AND APPARATUS FOR USE IN SURVEILLANCE SYSTEMS

(75) Inventors: James W. O'Toole, Jr., Somerville, MA (US); Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 697 days.

(21) Appl. No.: 10/624,297

(22) Filed: Jul. 22, 2003

(51) Int. Cl.
H04N 7/167 (2006.01)

(52) U.S. Cl. ............... 380/228; 380/229; 380/232; 380/239

(58) Field of Classification Search ............ 380/228, 380/229, 232, 239
See application file for complete search history.

(56) References Cited

U.S. PATENT DOCUMENTS

| | | | | |
|---|---|---|---|---|
| 5,517,568 A * | 5/1996 | Grube et al. | | 380/250 |
| 6,081,206 A * | 6/2000 | Kielland | | 340/937 |
| 6,397,334 B1 * | 5/2002 | Chainer et al. | | 713/176 |
| 6,636,256 B1 | 10/2003 | Passman et al. | | 348/143 |
| 6,640,145 B2 | 10/2003 | Hoffberg et al. | | 700/83 |
| 6,667,967 B1 | 12/2003 | Anderson et al. | | 370/351 |
| 6,720,920 B2 | 4/2004 | Breed et al. | | 342/386 |
| 6,751,297 B2 | 6/2004 | Nelkenbaum | | 379/88.13 |
| 6,791,472 B1 | 9/2004 | Hoffberg | | 340/905 |
| 6,907,123 B1 * | 6/2005 | Schier | | 380/28 |
| 7,120,252 B1 * | 10/2006 | Jones et al. | | 380/201 |
| 2003/0226023 A1 * | 12/2003 | Peters | | 713/193 |
| 2004/0085445 A1 * | 5/2004 | Park | | 348/143 |

* cited by examiner

*Primary Examiner*—Gilberto Barron, Jr.
*Assistant Examiner*—Devin Almeida
(74) *Attorney, Agent, or Firm*—BainwoodHuang (57) ABSTRACT

A control signal is provided to a video data acquisition system that generates video data. In response to receiving the control signal, the video data acquisition system modifies at least a portion of the video data to produce an output signal. Authenticity of the output signal from the video data acquisition system is verified by checking that the video data includes modifications according to the control signal. If the video data does not include such modifications, it is known that the video data acquisition system needs to be checked for tampering or system failures.

6 Claims, 9 Drawing Sheets

METHODS AND APPARATUS FOR USE IN SURVEILLANCE SYSTEMS

BACKGROUND OF THE INVENTION

Surveillance systems including cameras typically provide at least a minimum level of security for retailers to protect against theft and other crimes. Although thieves can learn how to avoid being caught by such systems, it is often difficult to deny culpability when a criminal activity is captured on video. Thus, surveillance serves to deter criminal behavior because one may be identified from recorded footage.

The sophistication of a digital surveillance system can vary depending on the application. For example, in a lower cost application, a single camera is typically mounted in the vicinity of a cash register at, for example, a convenience store. Video data generated by such a camera is either stored in a local memory storage device or is transmitted as digital data over the Internet to a remote memory storage device. In the event that a crime occurs, the video data is recovered from the storage device to positively identify the perpetrator.

More sophisticated surveillance systems include multiple cameras for simultaneous viewing of different locations such as different monitored sections of a retail store. Video signals generated by the cameras are fed to display monitors in a surveillance room occupied by security personnel who review the captured images for suspicious activity. Typically, the surveillance room is located in the same building as the premises being monitored and a local area network is utilized as a medium to transfer the video data from the cameras to the surveillance room. In certain applications, however, the video data is transmitted over an Internet connection to a faraway, central surveillance office where additional security personnel also review the video data.

SUMMARY

There are deficiencies associated with the use of modern day surveillance systems. For example, video data requires significant bandwidth for transmission. Thus, it is typically prohibitive to send continuous video data over a Wide Area Network (WAN) such as the Internet to a remote site. Consequently, video data generated by a particular camera is sometimes limited to local viewing. In addition to limited or costly bandwidth, a potentially enormous amount of memory storage is required to store continuous streams of video data at a remote storage site.

Even if the price is paid to obtain the bandwidth and memory storage facilities required to store large amounts of continuous video data, most modern surveillance systems do not provide assurance that the video data received from a remote camera is authentic. For example, consider that a live feed from a surveillance camera can be disconnected and a pre-recorded VCR (Video Cassette Recorder) signal supplied in its place to prevent security personnel from viewing actual real-time surveillance video of a crime that would have otherwise been captured.

Another deficiency associated with modern day surveillance systems is their general threat to individual privacy. For example, in addition to implementing surveillance systems in private places such as banks, ATMs (Automatic Teller Machines), retail stores, and offices, surveillance systems are also implemented at public places such as subways, bus terminals, parking lots and the like. Use of conventional surveillance systems such as continuous video surveillance in private places such as lavatories or semi-private places such as homes, office workplaces, hallways, and elevators is typically questionable (or distasteful) because of our society's expectation of at least a modicum of privacy in such places. Consider that persons may have a reasonable expectation of privacy depending on external factors. For example, one may have a reasonable expectation that his/her bedroom is "private" at all times, but one may only reasonably expect an elevator to be at least temporarily private when he/she is the only person in it.

There is little assurance that video footage captured in private or semi-private places will not be misused. Consequently, conventional surveillance systems are not well-suited for situations in which persons have a reasonable expectation of privacy in private or semi-private places. Unfortunately, crimes can and do occur in such private or semi-private places—crimes that might have been deterred or solved by appropriate surveillance.

It is an advancement in the art to overcome these and other deficiencies by providing more efficient, less privacy-invasive surveillance systems.

One aspect of the present invention involves authenticating video data from a video data acquisition system. To ensure that received video data is authentic (e.g., not tampered with), a control signal is provided to the video data acquisition system. In response to receiving the control signal, the video data acquisition system modifies at least a portion of the video data included in an output signal. Authenticity of the output signal from the video data acquisition system is verified by checking that the video data includes modifications according to the control signal. If the video data does not include the modifications, then it is known that the video data acquisition system needs to be checked for tampering or system failures.

In one application, the control signal includes a key for encrypting the video data generated by the video data acquisition system. If the video data is not encrypted according to the key, it is known that the video is not authentic.

In another application, the control signal includes a command to overlay a recognizable pattern onto the video data such that the recognizable pattern appears on a viewing display when the video data is replayed for a viewer such as security personnel. For example, in response to receiving a command to overlay a recognizable pattern on the video data, a clock time stamp or text string associated with the video data is modified at the video data acquisition system. The pattern provides a visual cue to a viewer that the video data is authentic. The recognizable pattern can be a logo that changes in response to the control signal.

Another aspect of the present invention involves authenticating video data via the use of a hashing function. In general, video data such as a video data stream is received from a video data acquisition system. Selected portions of the video data such as video frames are hashed to produce a hash value that is stored in both a local and remote memory storage device. The corresponding video data is also stored in the local memory storage device. In this embodiment, the hash value stored in the remote memory storage device is used to authenticate the video data stored in the local memory storage device. For example, portions of selected video data stored in the local memory storage device are re-hashed using the same hashing function. The results of the re-hash should match that of the hash value stored in the remote memory storage device. Based on this technique, video data is authenticated without having to also store raw video data in the remote memory device.

Yet another aspect of the present invention involves a technique of generating an output signal from a video data acquisition system. A camera generates a video signal that varies depending on sensed images. A processor encrypts the video signal using a first key. In addition to encrypting the video signal, the processor encrypts the first key using a second key. At a minimum, the encrypted first key and encrypted video signal are then combined to produce the output signal from the video data acquisition device. Encryption of the first key with the second key provides an added level of encryption security.

In one application, the processor encrypts sessions, e.g., portions of video data for a duration of time, of the video signal via a session key produced by a random number generator. Based on this technique, different portions of a video data stream are encrypted using different, randomly generated session encryption keys. Recovery of video data can be restricted to a particular session by providing knowledge of only a corresponding session key.

The video data acquisition system optionally generates the output signal to include multiple tracks. One of the tracks optionally includes the encrypted video signal and the encrypted first key. Another track includes data provided by a sensor associated with the video data acquisition system. The video data acquisition system also optionally encrypts the sensor data using an encryption key. An example of such sensor data is RFID (Radio Frequency Identification) information associated with objects or people in a vicinity of the video data acquisition system at a time of sensing corresponding images. Generating the output signal as multiple tracks renders it easier to manage different but related data transmitted in the output signal.

The video data acquisition system optionally includes a recognition algorithm to identify objects associated with sensed images. In response to recognizing an object captured by the sensed images, an encryption processor embeds encrypted data information identifying the recognized object in the output signal.

In yet another embodiment of the present invention, the video data acquisition system encrypts at least a portion of its output signal using an encryption key (e.g., public encryption key). Confidentiality of a private key corresponding to the public encryption key is maintained so that recorded subjects of the video data acquisition system do not have access to the video data recorded by the video data acquisition system. Instead, knowledge of the private encryption key is entrusted to an escrow agent. In the event that it is proper to recover the video data, the escrow agent is notified to decrypt selected portions of the output signal using the secret encryption key. This technique of encrypting video data extends potential use of video surveillance systems to semi-private and possibly private places without invading one's sense of privacy.

In one application, the video data acquisition system encrypts the video data according to a hierarchical set of keys including the public encryption key. For example, the public key is used to encrypt another key which in turn is used to encrypt other parts of the output signal. To decrypt encrypted portions of the output signal, the private encryption key is used to decrypt other keys which are in turn used to decrypt portions of the output signal.

Still another aspect of the present invention involves receiving a video signal that varies depending on images sensed by a video camera. Selected portions of the video signal are encrypted using a first encryption key. In addition to receiving the video signal, the video data acquisition system receives a sensor signal that varies depending on detection of objects in a vicinity of the data acquisition system at a time of recording. Selected portions of the sensor signal are encrypted using a second encryption key. The encrypted video signal and encrypted sensor signal are combined to produce an output signal from the video data acquisition system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily drawn to scale, emphasis instead being placed upon illustrating the principles of the present invention.

DETAILED DESCRIPTION

As discussed, certain aspects of the present invention are directed for use in surveillance systems. For example, in one embodiment, raw video data generated by a camera is modified according to a control signal in order to verify its authenticity. In other embodiments, raw video data is encrypted along with other relevant data using a public encryption key for which a corresponding private key is entrusted to an escrow agent. To recover encrypted video data, a specific need for captured video must be shown because recovery of such data may result in an invasion of an individual's privacy.

It should be noted that although the techniques described herein can be used in surveillance systems, and particularly to authenticating and recovering video data stored in memory, the techniques are also well-suited for other applications.

Figure 1:
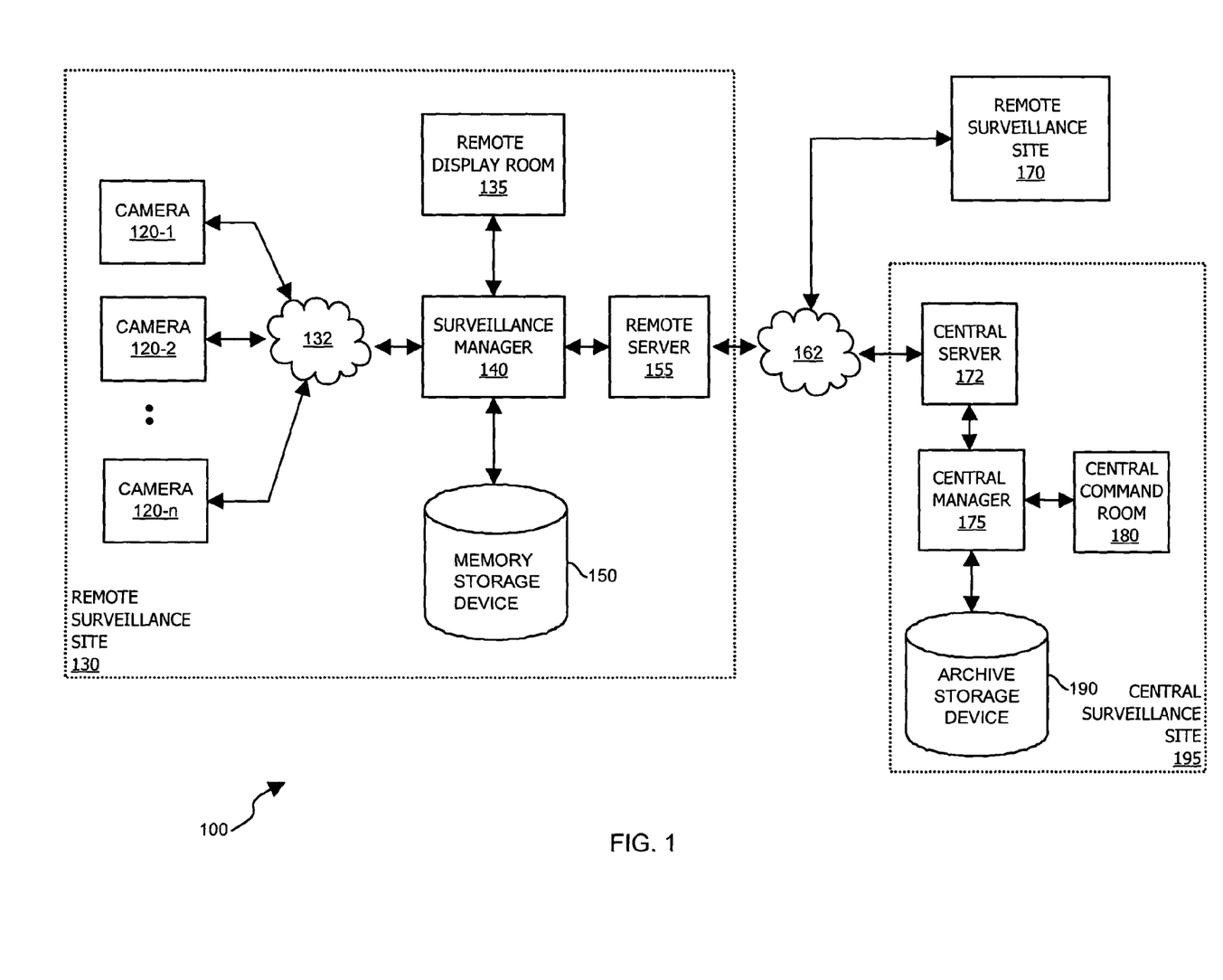
FIG. 1 is a block diagram of a surveillance system.

FIG. 1 is a block diagram of surveillance system 100 including multiple remote surveillance sites 130, 170 coupled via network 162 to central surveillance site 195. As shown, remote surveillance site 130 includes cameras 120-1, 120-2, . . . , 120-n, network 132, surveillance manager 140, memory storage device 150, remote display room 135, and remote server 155. Central surveillance site 195 includes central server 172, central manager 175, archive storage device 190, and central command room 180.

In general, cameras 120 generate video data streams over network 132 to surveillance manager 140 such as a personal computer device. Generated video streams from cameras 120 are forwarded from surveillance manager 140 to remote display room 135, remote server 155 and memory storage device 150. Remote display room includes equipment such as computers and monitor devices so that surveillance personnel can view events captured by cameras 120. Remote server 155 provides a gateway to network 162 such as the Internet to transmit captured video streams to other locations. Lastly, memory storage device 150 serves as a mechanism to store video images captured by cameras 120.

In the context of a retail store application, surveillance system 100 includes multiple cameras 120 each of which is located in a different section of the retail store. Network 132 provides a medium for transferring data such as data packets packaged according to TCP/IP (Transmission Control Protocol/Internet Protocol). Network 132 is optionally a hardwired or wireless system such as a LAN (Local Area Network).

Surveillance manager routes real-time video data (and any related data) generated by cameras 120 to memory storage device 150. In addition to storing video data in memory storage device 150, surveillance manager 140 forwards video data generated by cameras 120 to remote server 155 for transmission over network 162 such as the Internet to remote surveillance site 195. Similarly, remote surveillance site 170 generates video data and transmits it over network 162 to central surveillance site 195. Based on this topology, surveillance personnel located at central command room 120 can review images produced by cameras 120 at different stores located throughout the country.

Central server 172 receives the video data generated by remote surveillance site 130 and remote surveillance site 170 and, in turn, forwards it to central manager 175. Depending on the circumstances, central manager 175 forwards the received video data to central command room 180 and archive storage device 190. In the event that a crime is captured on camera 120, the corresponding video images can be reviewed by security personnel at both remote display room 135 and central command room 180. If appropriate, images captured on video data can be used as evidence in court to support prosecution of criminals. The following figure illustrates a technique of reducing the amount of data stored at a potentially faraway location such as archive storage device 190.

Figure 2:
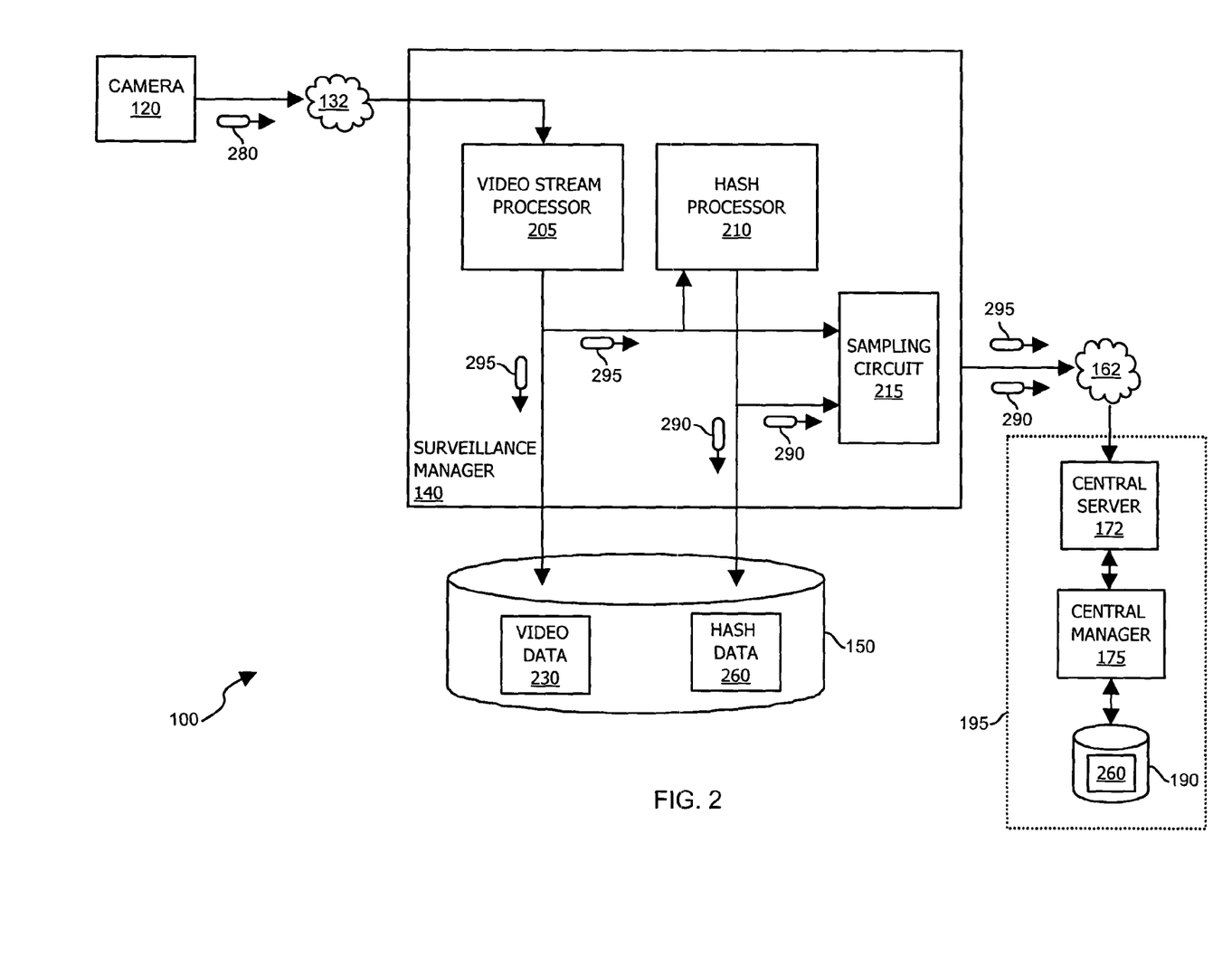
FIG. 2 is a detailed block diagram of a surveillance manager that processes data information for local and remote storage.

FIG. 2 is a more detailed block diagram of surveillance manager 140 (in FIG. 1) for reducing network traffic such as video data transmitted over network 162. As particularly shown, surveillance manager 140 further includes video stream processor 205, hash processor 210, and sampling circuit 215.

As previously discussed, camera 120 generates video stream 280 in the form of multiple data packets. Transmission of video stream 280 from camera 120 over network 132 is relatively unimpeded because memory storage device 150 is local to camera 120 and network 132, such as a LAN, typically supports bandwidths of 100 megabits per second or more. Thus, ample bandwidth to locally route video stream 280 is relatively inexpensive.

At remote surveillance site 130, video stream processor 205 of surveillance manager 140 processes video stream 280 to create frames 295 of video data 230 stored in memory storage device 150. In this way, a continuous video stream 280 such as frames 295 is stored at remote surveillance site 130.

Hash processor 210 generates hash values 290 for selected portions of video stream 280 such as frames 295 using a hashing function. Hash processor 210 stores hash values 290 along with associated frames 295 in memory storage device 150.

One aspect of the present invention involves reducing an amount of data that is transmitted over network 162 while still providing an assurance to security personnel at central surveillance site 195 that video stream 280 generated by camera 120 is authentic. Rather than transmitting a continuous video stream 280 over network 162 having a potentially changing or unknown available bandwidth, surveillance manager 140 intercepts video stream 280 for processing and sends a reduced amount of data such as a hash values 290 over network 162 for storage in archive storage device 190 as hash data 260. Consequently, hash values 290 will be stored in two locations, namely, memory storage device 150 and archive memory storage device 190.

In one application, only a subset of generated hash values 290 are transmitted over network 162 in order to reduce an amount of hash data 260 that is stored in archive memory storage device 190. For example, sampling circuit 215 selects which hash values to 290 to transmit to central surveillance site 195. Thus, hash values 290 stored in archive memory storage device 190 include the same or a subset of the hash data 240 stored in memory storage device 150.

Transferring continuous video stream 280 over network 162 such as the Internet can be more difficult due to bandwidth constraints. Even for sites that have hundreds of megabits per second of LAN bandwidth, it is common to have only 1.5 megabits per second of WAN bandwidth. Since common video encoding techniques require one or more megabits per second for reasonable quality images, the WAN bandwidth is often inadequate for even a single video stream. Note that the problem of transmitting video data over the Internet is exacerbated when multiple video streams 280 from multiple cameras 120 are transmitted to a faraway location such as central surveillance site 195. Transmitting hash values 290 in lieu of transmitting a continuous video stream 280 reduces bandwidth requirements over network 162 and thus overall costs of attaining Internet services to transmit such data. For example, hash values 290 are potentially one or multiple orders of magnitude smaller than an amount of actual data associated with video stream 280. In addition to reduced bandwidth, size requirements associated with archive memory storage device 190 are relaxed because of the compactness of hash data 260 compared to video stream 280. In other words, a capacity of archive memory storage device 190 is potentially a magnitude smaller than what would otherwise be necessary to store continuous video stream 280.

Perhaps more significantly, storage of hash values 290 (as hash data 260) in archive memory storage device 190 enables personnel to authenticate video data 230 stored at remote surveillance site 130. To determine whether the video data 230 stored in memory device 150 is authentic and corresponds to hash data 260 stored in archive memory storage device 190, video data 230 in memory storage device 150 is retrieved and re-hashed using the same hashing function as that originally employed by hash processor 210. If the re-hash value of a stored frame 295 is identical to corresponding hash data 260 stored in archive storage device 190, it is known that such video data 230 (or corresponding frame 295) is authentic. Accordingly, this technique of storing hash values 290 at different locations in real-time provides a safeguard against tampering with video data 230 stored at remote memory storage device 150.

In addition to or in lieu of storing hash values 290 in archive memory storage device 195, occasional frames 295 of video stream 280 produced by video processor 205 are optionally selected by sample circuit 215 for transmission over network 162 for storage in archive storage device 190. As discussed, transmitting a reduced amount of data over network 162 reduces overall surveillance system costs.

Figure 3:
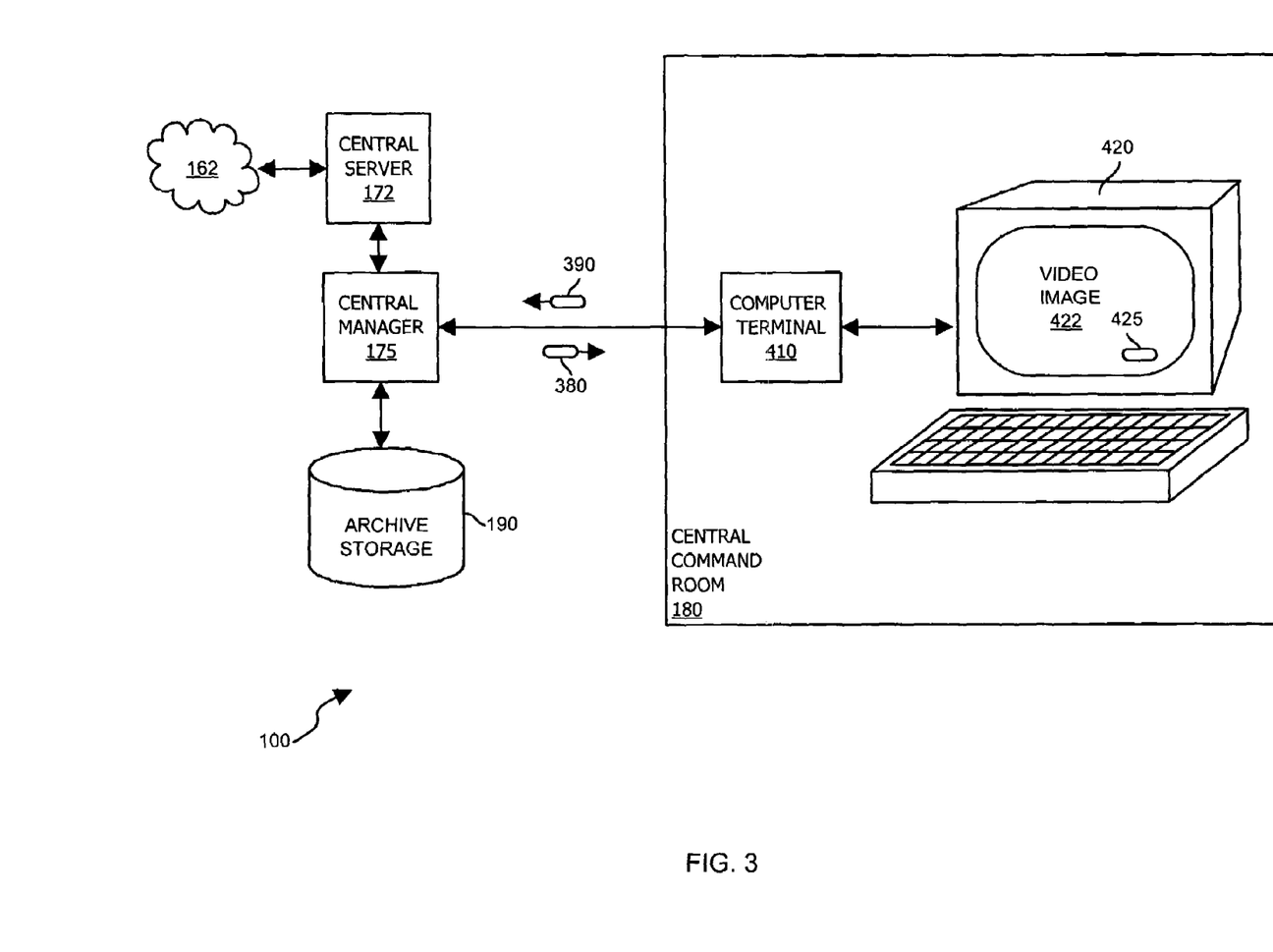
FIG. 3 is a block diagram of a surveillance system for generating a control signal to modify video data provided by remote surveillance sites.
Figure 4:
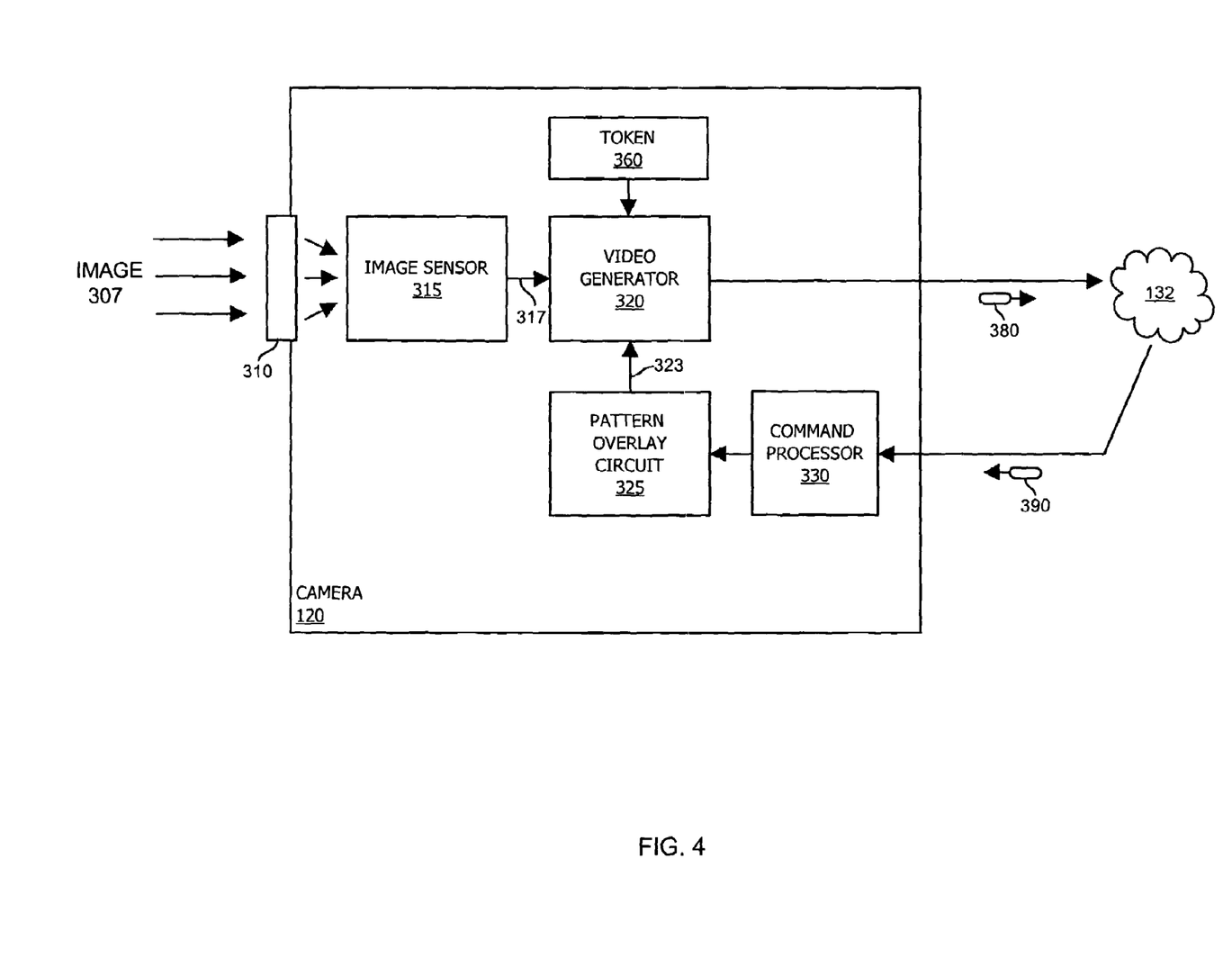
FIG. 4 is a block diagram of a video data acquisition system for receiving a control signal indicating how to modify its video data.

FIGS. 3 and 4 are more detailed and split block diagrams of surveillance system 100 (previously described in connection with FIG. 1) that authenticates video stream 380 supplied by camera 120.

As shown in FIG. 3, central command room 180 includes computer terminal 410 and display monitor 420. Central command room 180 enables surveillance personnel to monitor and authenticate video streams 380 received from remote surveillance sites 130, 170. For example, computer terminal 410 initially generates command signal 390 to a particular camera 120 indicating how it shall modify its outputted video stream 380. As will be further discussed in connection with FIG. 4, video stream 380 is authenticated by verifying that received video stream 380 is modified according to command signal 390.

FIG. 4 is a detailed block diagram of camera 120. As shown, camera 120 includes image sensor 315, video generator 320, token 360, pattern overlay circuit 325 and command processor 330.

As previously discussed and more specifically shown, command processor 330 of camera 120 receives command signal 390 generated by computer terminal 410. Depending on contents of command signal 390, command processor 330 programs pattern overlay circuit 325 to modify video stream 380 produced by video generator 320. For example, image sensor 315 senses image 307 through lens 310. Image sensor 315 then forwards raw image data 317 to video generator 320 that produces video stream 380 such as video frames in the form of network data packets. Pattern overlay circuit 325 provides control signal 323 to video generator 320 indicating how to modify video stream 380 generated by video generator 320 so that it includes overlay pattern 425 (FIG. 3) such as a specific text string or logo.

Referring again to FIG. 3, video stream 380 is received at computer terminal 410 and displayed on display monitor 420. In this way, computer terminal 410 provides command signal 390 to a video data acquisition device such as camera 120. In response to command signal 390, camera 120 and, more specifically, video generator 320 modifies video data stream 380 to include the selected pattern 425 as indicated by command signal 390.

Surveillance personnel operating computer terminal 410 authenticate received video images from camera 120 based upon pattern 425 overlaid on the video image 422 of display monitor 420. For example, surveillance personnel at computer terminal 410 can verify that video stream 380 is authentic if it includes the appropriate pattern 425 as requested by previous command signal 390.

In one application, pattern 425 is a logo or text string that is periodically changed according to command signal 390 to ensure that the video data stream 380 provided by camera 120 is authentic. This authentication feature is optionally implemented via software (automated to minimize intervention by security personnel at central command room 180) so that pattern 425 is changed at specific or random times. In this context, computer terminal 410 processes video stream 380 received from camera 120 to identify whether video stream 380 received at a particular time includes the appropriate pattern 425 according to command 390.

In one application, pattern 425 is a time stamp value associated with the time of recording video data stream 380. In this instance, computer terminal 410 occasionally or periodically sends command signal 390 to modify the time stamp (or time setting) associated with camera 120. If the time stamp associated with video data stream 380 does not change according to command signal 390, it is known that the video data stream 380 is not authentic. Reasons for failing the authentication process includes disconnection of camera 120, substitution of a bad camera 120, or receipt of fake recorded footage supplied by a VCR feed instead of camera 120. Further action can be taken to identify a cause in the event of a camera 120 failure.

In addition to or in lieu of authenticating video stream 380 via overlay pattern 425, camera 120 can utilize token 360 such as a registration code (or certificate encoded according to the X.509 standard) for authentication purposes. For example, video generator 320 optionally generates video data stream 380 to include token 360 (such as a secret binary code) that is embedded in video stream 380 sent to central surveillance site 195. Computer terminal 410 searches for certificate 360 in video stream 380 to verify its authenticity. Token 360 (or digital certificate) is optionally programmed prior to installation of corresponding camera 120 or is programmed in response to receiving appropriate command signal 390.

One or more digital certificates may be programmed into camera 120. A certificate (or token 360) associated with camera 120 itself might be of a type used by camera 120 to authenticate its own output, e.g., to prove that a certain output was generated by a corresponding camera 120. To operate in this manner, camera 120 would store both the certificate (containing a public key) and also a private (secret) key corresponding to that public key. Camera 120 would include the certificate in its output signal and also would use the secret key to perform a digital signature operation (computation) on the video output signal or on certain portions (typically hash code) of the video output signal. Based on this technique, a recipient of the signal (or a viewer of the stored video signal) can validate a corresponding digital signature using well-known or any suitable signature validation methods.

Alternatively, or in combination with the embodiment above, camera 120 may be programmed with a certificate (token 360) corresponding to an escrow agent or surveillance system operator. Such a certificate would include a public encryption key for that entity. In this way, a "secret" key such as a private key entrusted to an escrow agent or system operator can be used to decrypt the encrypted video stream. The certificate may be provided to camera 120 to enable the camera to validate that this operator or agent is "privacy certified." Camera 120 might determine whether the certificate (token 360) is valid by performing well-known signature validation calculations and relying on a "root public key" stored in camera 120 by its manufacturer, or by performing querying a certificate validation service via standard network protocols such as SCVP (Simple Certificate Validation Protocol) or as described, for example, in IETF (Internet Engineering Task Force) RFC 2560. Camera 120 may also continue to operate without a valid certificate but in a mode that actively advertises the likely lack of privacy protection, such as by flashing a light and generating a warning sound.

Figure 5:
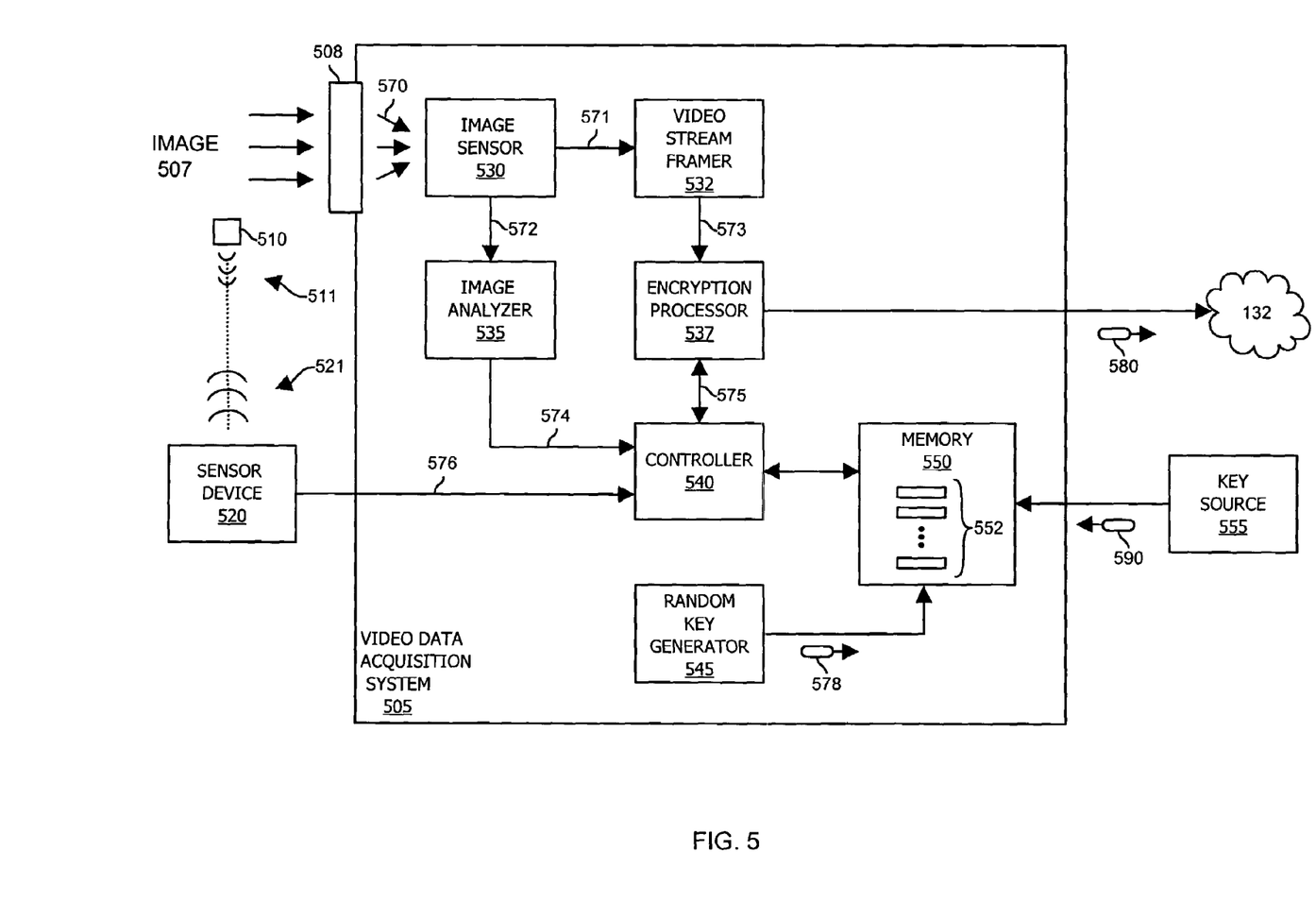
FIG. 5 is a block diagram of a video data acquisition system that produces an output signal including video data and related sensor data.

FIG. 5 is a block diagram of video data acquisition system 505 and related peripheral subsystems. As shown, video data acquisition system 505 includes lens 508, image sensor 530, image analyzer 535, video stream framer 532, encryption processor 537, controller 540, memory 550, and random key generator 545. Peripheral subsystems associated with data acquisition system 505 include key source 555, transducer 510, and sensor device 520. It should be noted that video acquisition system 505 is well-suited for many applications including surveillance system 100 (in FIG. 1). Based on this topology, video data acquisition system 505 and related peripheral items are well-suited for replacing camera 120 and use in embodiments discussed in FIGS. 1-4.

One feature of video acquisition system 505 involves producing output signal 580 from encryption processor 537.

Output signal 580 includes encrypted data from video stream 573 and encrypted data associated with sensor signal 576 using different encryption keys. For example, one key may be used to encrypt video image data while another key is used to encrypt sensor data. The use of multiple encryption keys to encrypt different portions of data in output signal 580 provides security and flexibility because decryption of output signal 580 is limited depending on which encryption keys are known to a user attempting decryption.

By way of example, image sensor 530 senses image 507 through lens 508 and forwards associated raw video data 571 to video stream framer 532 such as an MPEG (Moving Pictures Experts Group) compressor. In turn, video stream framer 532 produces video stream 573 such as video data formatted according to an MPEG compression algorithm.

Encryption processor 537 encrypts video stream 573 provided by video stream framer 532 to produce at least a portion of output signal 580. In addition to encrypted video stream 573, output signal 580 optionally includes encrypted sensor data 576 such as RFID (Radio Frequency Identification) sensor data.

Sensor device 520 is optionally a motion detector including a corresponding optical subsystem for auto-focusing lens 508 to capture image 507.

To generate sensor data 576 associated with image 507, sensor device 520 initially transmits wireless signal 521 in the vicinity of video data acquisition system 505. In response to receiving wireless signal 521, source 510 such as RFID tag generates wireless reply signal 511 to sensor device 520. In this way, sensor device 520 detects a presence of sources 510 such as a personal badge or identification tag associated with an object in vicinity of lens 508. In one application, source 510 is a person or object and sensor device 520 is an infrared detector that detects corresponding heat energy generated or reflected by source 510.

Sensor data 576 generated by sensor device 520 is forwarded to controller 540. Controller 540 processes sensor data 576 and generates data stream 575 to encryption processor 537 such as an AES encryption chip. As will be further discussed in the following text and figures, video data stream 573 and sensor data 576 are encrypted in real-time to produce output signal 580. This technique of embedding multiple types of data in output signal 580 enables matching of sensor data 576 with captured video images 507.

In a retail application, video data acquisition system 505 is located in an aisle of a store along with sensor device 520. In such an application, each product in the store include an identification tag such as transducer 510 (or RFID tag). Thus, an image of a person and an RFID tag associated with the product (and transducer 510) can be stored in output signal 580. If the detected product is not later identified as being purchased at a cash register, details of a potential theft can be further investigated based on review of the captured video images.

Storing sensor data 576 and video data stream 573 in this way enables one to search for video clips based on RFID tag information or recognized images. For example, sensor data 576 such as a particular RFID tag or recognized image can be used as an index to find corresponding video stream 573 of output signal 580.

In one application, video data acquisition system 505 includes image analyzer 535. In such an instance, image sensor 530 produces image signal 572 based on detection of a particular image 507. Image analyzer 535 includes a recognition algorithm to identify patterns associated with image signal 572 or, more generally, image 507 captured by video data acquisition system 505.

In response to identifying or recognizing a pattern such as a person or object associated with detected image 507, image analyzer 535 generates recognition data 574 to controller 540. In turn, controller 540 forwards the recognition data 574 to encryption processor 537 for encryption and inclusion in output signal 580.

Embedding recognition data 574 (e.g., bar codes, matrix codes, text/characters of license plates, etc.) associated with image 507 in output signal 580 along with corresponding video stream 573 enables one to search output signal 580 based on recognized patterns. For example, image analyzer recognizes an object associated with video stream 573 and a corresponding code is embedded in output signal 580 corresponding to the recognized pattern or object. To find the recognized object, a searcher need only locate the associated code in output signal 580 to identify a segment of output signal 580 including corresponding video signal 573. As previously discussed, a similar search technique is used to locate ID tag information in output signal 580. Thus, inclusion of recognition data 574 and/or sensor data 576 enables indexing of events associated with output signal 580.

Another aspect of video data acquisition system 505 involves a novel technique of encrypting data to produce output signal 580. For example, video data acquisition system 505 encrypts at least a portion of output signal 580 using encryption key 590 provided by key source 555 such as a manufacturer of video data acquisition system 505.

Embodiments of the present invention are well-suited for using different types of encryption techniques. For example, symmetric encryption may include encrypting data based on a shared secret key, in which the same encryption key is used for both encryption and decryption. Asymmetric encryption or public-key encryption uses two different keys, one of which is a private key and, another of which is a public (open) key. Key-escrow encryption involves a potential third party or partial key held by the escrow agent. For purposes of illustrating a particular embodiment, video data acquisition system will be described using asymmetric encryption. However, other encryption techniques such as symmetric encryption can be used instead. In the context of asymmetric encryption such as when video data acquisition system 505 encrypts images 507 based on public encryption key 590, confidentiality of a corresponding private encryption key is maintained so that recorded subjects such as persons captured by video data acquisition system 505 cannot decrypt output signal 580 and modify its contents. Knowledge of the private key associated with public encryption key 590 is entrusted to a non-biased party such as an escrow agent. Additional details of this embodiment will be discussed in connection with FIG. 9 later in this specification.

In one application, video data acquisition system 505 receives public encryption key 590 such as a certificate provided by the owner/operator of video data acquisition system 505. Such a certificate is only acceptable to video data acquisition system 505 if it is signed by a designated authority, which would typically be some joint-action role of the manufacturer and some legal authority with jurisdiction or licensing authority over the use of video surveillance in the area of sale/use of video data acquisition system 505.

In one arrangement, random key generator 545 generates random encryption keys 578 (or session keys) that are in turn used to encrypt portions of data included in output signal 580. Memory 550 optionally stores the random keys 578 along with public encryption key 590 as encryption keys 552. Controller 540 accesses encryption keys 552 stored in memory 550 and supplies them to encryption processor 537 which, in turn, encrypts video stream 573, recognition data 574 and sensor data 576 to produce output signal 580. A new encryption key 578 can be generated every few seconds so that random key 578 being used to encrypt video stream 573 changes fairly rapidly. More specific details of encrypting data to produce output signal 580 is illustrated in the following figures.

Video data acquisition system 505 is optionally powered via a hardwired cable connection to network 132 also supporting transmission of data packets 580. Instead of a hardwired cable, a wireless network connection can be used to deny attacks that prevent video data acquisition system 505 connection to network 132.

In one application, identification badges worn by humans present encryption key information (via sensor device 520) so that video data acquisition system 505 and, more specifically, controller 540 causes automatic encryption of random encryption keys 578 based on keys 552 chosen by those individuals. Such a video data acquisition system 505 operated in this way can enable each individual to access (perhaps for a fee) any and all captured video 574 covering events at which he/she was detected.

Figure 6:
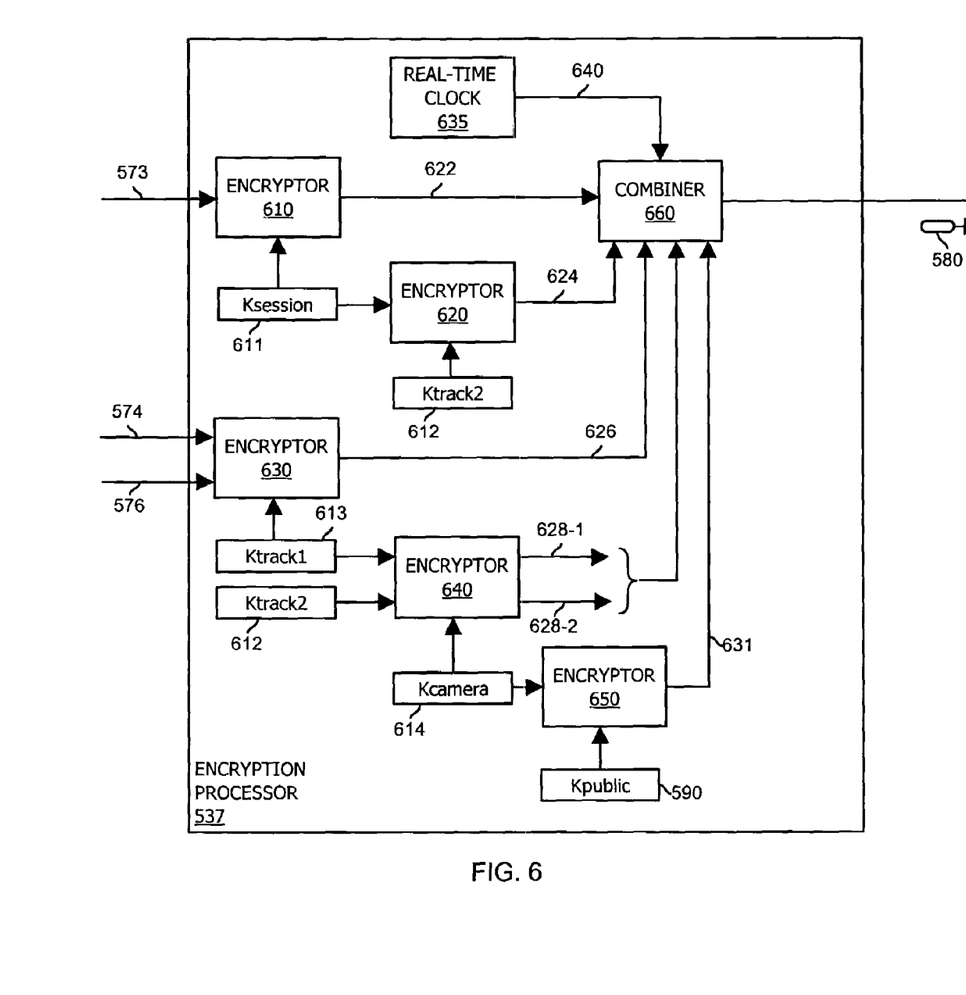
FIG. 6 is a block diagram illustrating a technique of encrypting different portions of an output signal.

FIG. 6 is a detailed block diagram of encryption processor 537. As shown, encryption processor includes encryptor 610, encryptor 620, encryptor 630, encryptor 640, encryptor 650, real-time clock 635, and combiner 660. Encryption keys include session key 611, track key 612, track key 613, camera key 614 and public key 590.

In general, encryption processor 537 encrypts video stream 573, recognition signal 574, and sensor signal 576 using a hierarchical set of keys. For example, encryptor 610 encrypts video stream 573 using session key 611 (such as a session key 611 generated by random key generator 545) to produce encrypted video data 622. Real-time clock 635 generates time stamps 640 that are optionally included in output signal 580 to identify a time at which corresponding data was recorded.

Encryptor 620 encrypts session key 611 to produce encrypted session key 624. Encryptor 630 encrypts recognition data 574 and sensor data 576 using track key 613 to produce encrypted signal 626.

Encryptor 640 encrypts track key 613 (Ktrack1) via camera key 614 to produce encrypted track key 628. Additionally, encryptor 640 encrypts track key 612 (Ktrack2) via camera key 614 to produce encrypted track key 628-2. Lastly, encryptor 650 encrypts camera key 614 using public key 590 to produce encrypted camera key 631.

Encrypted video data 622, encrypted session key 624, encrypted signal 626, encrypted track key 628, and encrypted camera key 631 are combined via combiner 660 to produce output signal 580. A breakdown of different components (such as tracks 710) of output signal 580 is illustrated in FIG. 7.

Figure 7:
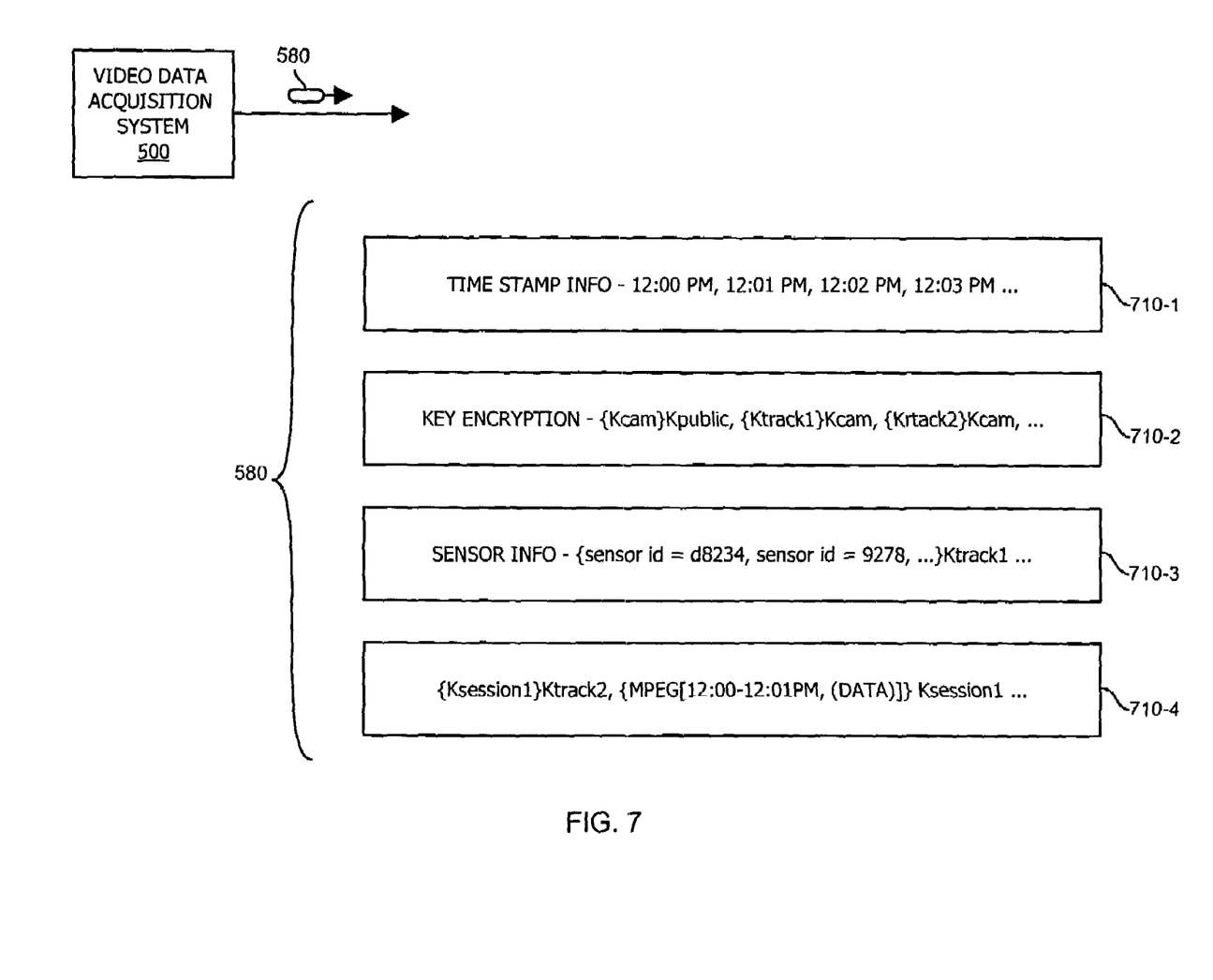
FIG. 7 is a diagram of an output signal including multiple tracks of related data.

As shown in FIG. 7, output signal 580 includes track 710-1, track 710-2, track 710-3, and track 710-4. Each track 710 includes a different set of real-time data associated with output signal 580 for eventual storage on media such as recording tapes, storage disks, etc.

Separating output signal 580 to include multiple tracks 710 enables storage of related data in real-time. For example, encrypted signal 626 (including recognition data 574 and sensor data 576) is stored in track 710-3 while related encrypted video data 622 is stored in track 710-3. Track 710-2 includes encrypted camera key 631, and encrypted track keys 628. Track 710-1 includes time stamps 640 to identify when video stream 573 and corresponding sensor data 576 and recognition data 574 are recorded in real-time. Note that information in track 710-2, 710-3, and 710-4 are all encrypted using different encryption keys. Thus, encrypted information in a track 710 is not accessible without knowledge of a private key associated with public key 590. For example, in track 710-2, Kpublic 590 is used to encrypt camera key Kcam 614. Camera key Kcam 614 is used to encrypt Ktrack1 and Ktrack2 keys 613, 612. In track 710-3, Ktrack1 key 613 is used to encrypt sensor ID information. Lastly, in track 710-4, session key Ksession1 611 is used to encrypt MPEG video data recorded between 12:00-12:01 PM. Ktrack2 612 is used to Ksession1 key. This overall technique is pictorially shown in FIG. 6.

Referring again to FIG. 7, a secret key (such as a private key corresponding to a public key 590 used to encrypt data) held by an escrow agent may be used to decrypt portions of any given stored multi-track video (tracks 710), particularly to decrypt portions of tracks 710 containing encrypted track, session, camera keys, etc. For example, the private key potentially held by an escrow agent may be used to decrypt camera key 614; camera key 614 may be used to decrypt track keys 612, 613; track keys 612, 613 may be used to decrypt sessions keys 611; and so on. Thus, by decrypting portions of tracks 710, the agent can use obtained (or decrypted) keys to decrypt other portions such as video data portions of tracks 710.

One aspect of video data acquisition system 505 involves use of different random keys 578 (such as sessions keys) for short periods of time to produce many (possibly continuous) encrypted segments including relatively large portions of video data. Depending on how often the random keys change over time, relatively faster/slower encryption algorithms may be required. It may be desirable for randomly chosen keys to vary rapidly and not be permanently stored in any particular place but in the encrypted video output as encrypted keys.

If the random keys change every few seconds, and thus are being encrypted and transmitted every few seconds in the corresponding encrypted video stream, the process of encryption preferably will keep up with a rate of generating the encrypted stream. However, camera 120 may at some frequency output encrypted information (such as output signal 631) that doesn't change so frequently and that can be decrypted by the escrow agent. Consequently, the escrow agent would be able to decrypt the output of encryptor 650. In one embodiment, therefore, an asymmetric algorithm is used for at least encryptor 650, and so those encryptions might involve larger key sizes (such as a 1000-bit key or even more). Use of a large key may impede an encryption rate. However, this may be tolerable when the key changes less often.

Figure 8:
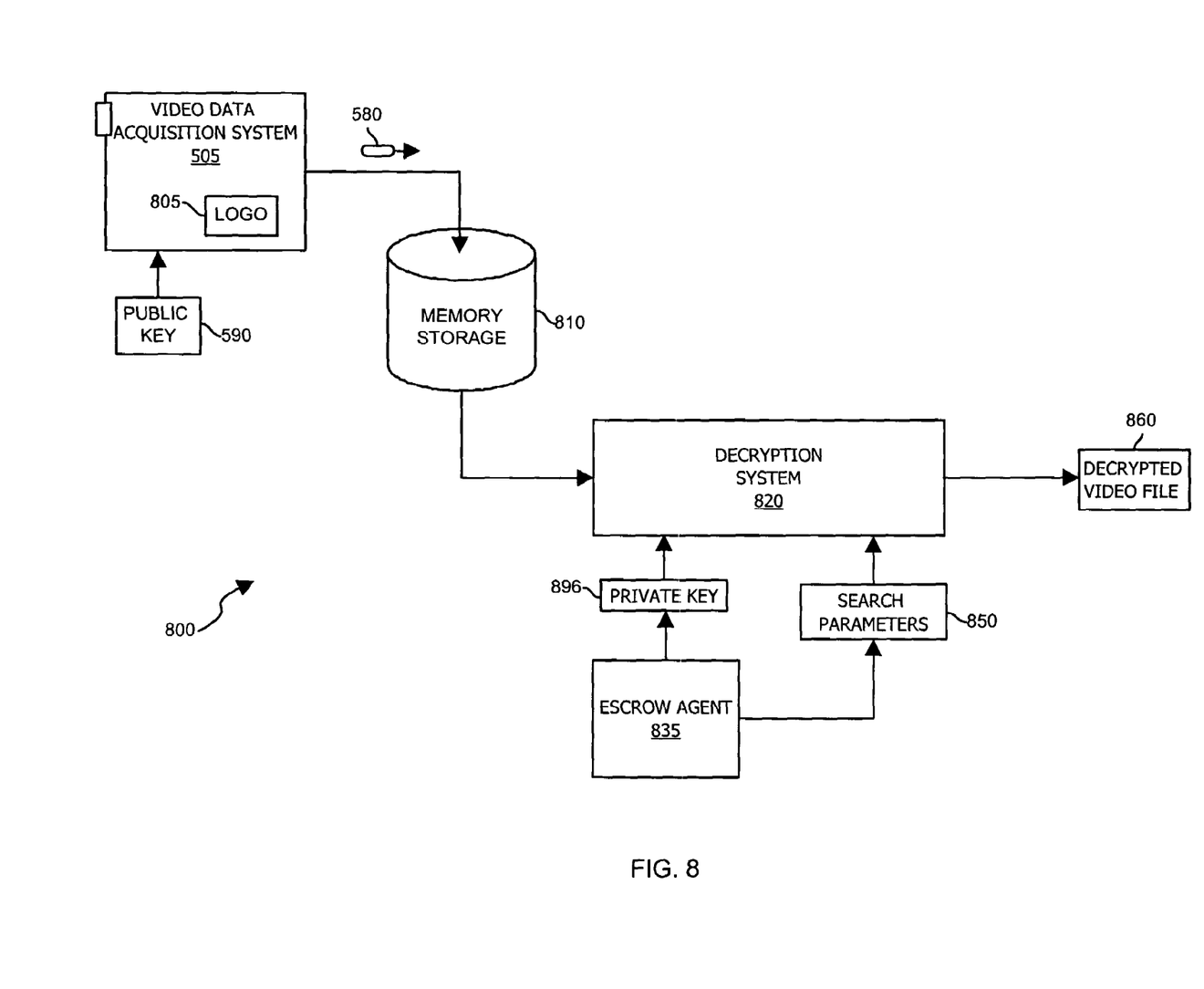
FIG. 8 is a block diagram of a system to decrypt video data using a secret key entrusted to an escrow agent.

FIG. 8 is a block diagram illustrating a method of recovering output signal 580 from video data acquisition system 505 (FIG. 5) encrypted with secret encryption key 590. As shown, system 800 includes video data acquisition system 505, memory storage 810, decryption system 820, secret key 590, escrow agent 835, search parameters 850, and decrypted video file 860.

In this embodiment, video data acquisition system 500 includes an easily recognized logo 805 such as a "privacy-favorable" brand/log indicating to persons that video from such a surveillance device is encrypted in which a corresponding private key 896 is known only to an escrow agent 835. Thus, subjects of video data acquisition 505 such as consumers can trust that encrypted video data in output signal 580 will not be accessible without, for example, issuance of a court order or other special purpose. Video data acquisition system 505 can be installed in semi-private or private places without persons fearing an invasion of their privacy because captured video data is subject to key escrow recovery procedures as will be further discussed.

As shown in FIG. 8 and as previously discussed, video data acquisition system 505 generates output signal 580 that is stored in memory storage 810 such as high-volume memory storage disks. In the event that a crime occurs in a lavatory being monitored by video data acquisition system 505, a court order such as a search warrant is issued ordering escrow agent 835 to decrypt at least relevant portions of output signal 580 that are likely to reveal information regarding a crime captured on video.

To decrypt specific portions of output signal 580, escrow agent 835 provides private key 896 (corresponding to public key 590) and search parameters 850 to decryption system 820. Search parameters 850 include information such as time stamp information 640, sensor data 576, or recognition data 574. Such parameters serve as an index to relevant portions of output signal 580 that need to be decrypted. Limiting a search and subsequent decryption of contents stored in memory storage 810 in this way protects privacy of innocent parties and brings guilty persons to justice. For example, in an extreme case in which video surveillance is used in a private place, a prankster will not be able to post video footage of a person in a lavatory to a publicly accessible website on the Internet. Additionally, the continuous encrypted video footage may capture the identity of a person who committed a potentially egregious crime.

Use of conventional surveillance systems such as continuous video surveillance in private places such as lavatories or semi-private places such as homes, office workplaces, hallways, and elevators is typically questionable (or distasteful) because of our society's expectation of at least a modicum of privacy in such places. Consequently, conventional surveillance systems are not well-suited for situations in which persons have a reasonable expectation of privacy in private or semi-private places. Based on use of encryption techniques as discussed according to an embodiment of the present application, video surveillance can be extended for use in semi-private and, in extreme cases, private places instead of merely public places. Using private encryption key 896 provided by escrow agent 835, decryption system 820 decrypts specified portions of output signal 580 to produce decrypted video file 860. For example, and as previously discussed, decryption system 820 utilizes secret encryption key 590 to decrypt camera key 614. In turn, knowledge of camera key 614 is used to decrypt track keys 612, 613. Track key 612 is then used to decrypt randomly generated session key 611. Decrypted session key 611 is then used to recover a segment of original video stream 573.

As previously discussed, output signal 580 includes potentially low bit-rate sensor data 576 (as compared to video data). The inclusion of this information in either encrypted or unencrypted form enables a presence of specific individuals in portions of recorded (encrypted) video stream 573 to be known without having to expose video stream 573 to "prying" eyes. Thus, output signal 580 may be useful even before invoking key-recovery procedures.

Inclusion of "presence" data (such as sensor data 576 identifying persons or objects) renders it possible for investigators to make narrower and more well-informed requests to invoke the key-escrow procedures to recover information. For example, authorities can limit recovery of captured video information based on the presence of specific individuals in output signal 580.

In one application (as discussed in FIG. 5), sensor data 576 includes ID information that indicates to controller 540 that a corresponding portion of video stream 573 (and/or output signal 580) shall be encrypted to protect the identity of the identified person. In this instance, the default rule is that any video stream 573 containing motion not assignable to identified "badges" will be easily subjected to recovery.

In yet another application, recovery of captured data in output signal 580 requires notification to individuals captured by video data acquisition system 505 that output signal 580 is being recovered. Such an individual may be granted a right to contest recovery of data such as video stream 573 or sensor data 576 captured by video acquisition system 505.

Consider an embodiment of video data acquisition system 505 that is used to monitor airport bathrooms, showers, hotel rooms, hallways, elevators, etc. Individuals captured on such a video data acquisition system 505 might not be free from video surveillance in public places, but note that networked digital surveillance technology as discussed can be augmented with appropriate encryption and meta-data labeling so that individuals have the right to insert their own labels and, in exchange, be effectively guaranteed that some privacy rights with respect to output signal 580 will be respected.

Even without video stream 573 preprocessing, it is possible to arrange for efficient notification of personnel who have been captured by video data acquisition system 505. For example, in a video data acquisition system 505 that broadcasts its unique identification string and date/time/frame-stamps, people carrying PDA (Personal Digital Assistant) devices can record a trace identifying a location of corresponding output signal 580 in which they are captured. Consequently, if an output signal 580 recovery action is published in a public register, individuals interested in knowing when their video stream 573 is being recovered could anonymously perform offline matching of their own PDA's camera-location trace records with the published record of key-recovery actions involving surveillance cameras.

Another feature that can be included in video data acquisition system 505 is the ability for authorized law-enforcement personnel in "hot pursuit" situations to use their identity to command specific video data acquisition system 505 into a more privacy-invasive mode. During an 'emergency' mode, video data acquisition system 505 may be loaded with a temporary key (different than an encryption key used in non-emergency modes as discussed in the above embodiment) to produce an encrypted video stream. Emergency personnel may be given access to the temporary key or private counterpart key (during the emergency) for immediately decrypting output signal 580 of video data acquisition system 505. Thus, video captured by video data acquisition system 505 is available as a real-time "live" surveillance feed. This is yet another situation in which a need for captured video data overrides an individual's expectation of privacy. In another embodiment, video data acquisition system 505 can be configured so that output signal 580 is not encrypted while in an emergency mode. In this case, video captured by video data acquisition system 505 is available as a real-time "live" surveillance feed so that emergency personnel can view images without having to decrypt corresponding data with a special encryption key. In both embodiments, as an additional feature, video data acquisition system 505 optionally causes a corresponding light to flash or speaker to beep indicating that video data acquisition system is in a reduced privacy mode.

Figure 9:
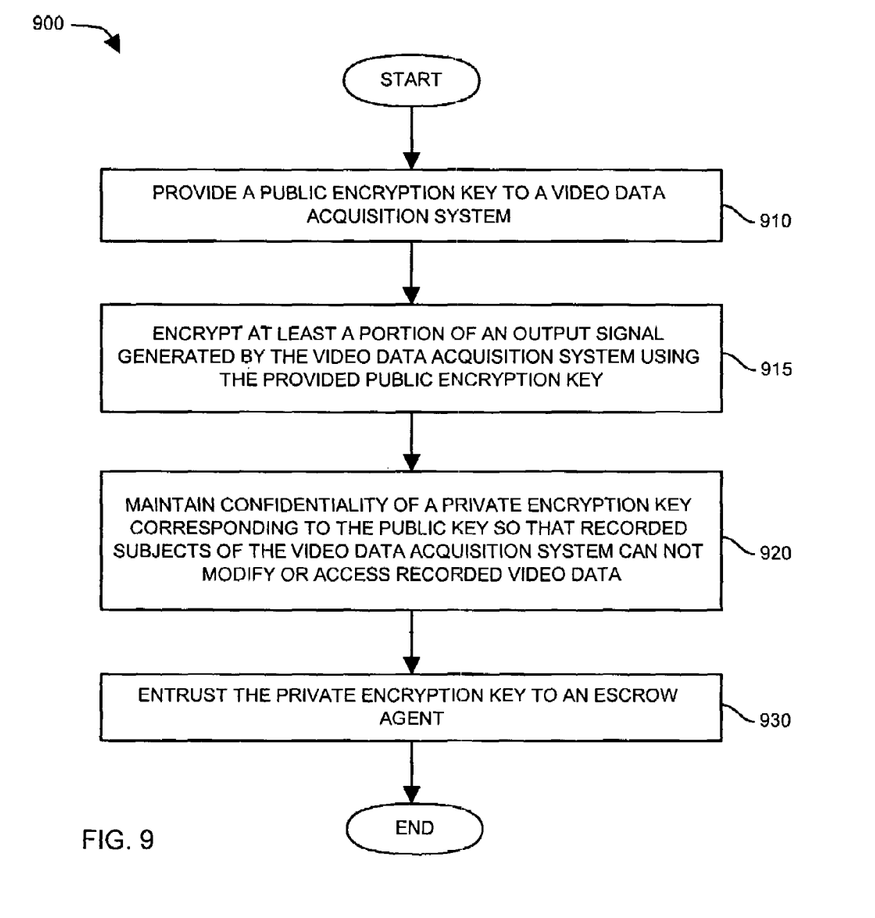
FIG. 9 is a flow chart illustrating a method for encrypting video data.

FIG. 9 is a flow chart 900 for maintaining confidentiality of output signal 580 from video acquisition system 505 based on use of public encryption key 590 and private key 896.

In step 910, key source 555 provides public encryption key 590 to video data acquisition system 505.

In step 915, encryption processor 505 encrypts at least a portion of output signal 580 using public encryption key 590.

In step 920, confidentiality of private encryption key 896 corresponding to public key 590 is maintained so that recorded subjects of video data acquisition system 505 do not have access to secret key 590.

In step 930, private encryption key 896 is entrusted to escrow agent 835 such as the ACLU (American Civil Liberties Union).

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of conducting surveillance comprising:
   placing a video data acquisition system (VDAS) in a public place to conduct surveillance of the public place;
   operating the VDAS, the VDAS producing a video signal depicting the public place, the video signal including a series of frames that correspond to different moments in time;
   encrypting the video signal using a first key, the first key being randomly generated such that a new randomly generated first key is used at different points in time;
   encrypting the first key using a second key;
   including at least the encrypted first key and encrypted video signal in an output signal;
   operating an image analyzer, the image analyzer:
      receiving the video signal from the VDAS;
      identifying a person depicted in a frame of the video signal by analyzing each frame of the video signal to look for patterns corresponding to specific persons; and
      for every identified person, embedding a code corresponding to that identified person in the output signal, the code being associated with the particular frame in which the pattern corresponding to the identified person was found;
   storing the output signal in a data storage medium;
   searching the data storage medium for a code corresponding to a specific person; and
   upon finding the code corresponding to the specific person in the data storage medium:
      decrypting, with the second key, the first key used to encrypt a portion of the video signal containing the frames associated with the code corresponding to the specific person;
      decrypting, with the decrypted first key, the portion of the video signal containing the frames associated with the code corresponding to the specific person; and
      displaying the portion of the video signal containing the frames associated with the code corresponding to the specific person.

2. A method as in claim 1 wherein embedding the code corresponding to that identified person in the output signal includes:
   encrypting the code with a third key, the third key being distinct from the first key so that a user, possessing only the third key but not the first key, can decrypt the code without having the capability to decrypt the video signal; and
   including the data encrypted with the third key in the output signal.

3. A system for conducting surveillance comprising:
   a video camera, the video camera being constructed and arranged to produce a video signal depicting a public place, the video signal including a series of frames that correspond to different moments in time;
   an image analyzer, the image analyzer being constructed and arranged to:
      receive the video signal from the video camera;
      identify a person depicted in a frame of the video signal by analyzing each frame of the video signal to look for patterns corresponding to specific persons; and
      for every identified person, transmit a code corresponding to that identified person to a controller, the code being associated with the particular frame in which the pattern corresponding to the identified person was found;
   an encryption processor, the encryption processor being constructed and arranged to:
      receive the video signal from the video camera;
      encrypt the video signal using a first key, the first key being randomly generated such that a new randomly generated first key is used at different points in time;
      encrypt the first key using a second key;
      receive the code corresponding to each identified person from the controller; and
      combine the encrypted video signal, the encrypted second key, and the code corresponding to each identified person into an output signal;
   a data storage medium for storing the output signal; and
   a decryption system, the decryption system being constructed and arranged to:
      search the data storage medium for a code corresponding to a specific person; and
      upon finding the code corresponding to the specific person in the data storage medium:
         decrypt, with the second key, the first key used to encrypt a portion of the video signal containing the frames associated with the code corresponding to the specific person;
         decrypt, with the decrypted first key, the portion of the video signal containing the frames associated with the code corresponding to the specific person; and
         display the portion of the video signal containing the frames associated with the code corresponding to the specific person.

4. A system as in claim 3 wherein the encryption processor is configured to, when combining the encrypted video signal, the encrypted second key, and the code corresponding to each identified person into the output signal:
   encrypt the code with a third key, the third key being distinct from the first key so that a user, possessing only the third key but not the first key, can decrypt the code without having the capability to decrypt the video signal; and
   include the data encrypted with the third key in the output signal in place of the unencrypted code.

5. A system for conducting surveillance comprising:
   means for producing a video signal depicting a public place, the video signal including a series of frames that correspond to different moments in time;
   means for:
      receiving the video signal from the means for producing the video signal;
      identifying a person depicted in a frame of the video signal by analyzing each frame of the video signal to look for patterns corresponding to specific persons; and
      for every identified person, generating a code corresponding to that identified person, the code being associated with the particular frame in which the pattern corresponding to the identified person was found;
      encrypting the video signal using a first key, the first key being randomly generated such that a new randomly generated first key is used at different points in time;
      encrypting the first key using a second key; and combining the encrypted video signal, the encrypted second key, and the code corresponding to each identified person into an output signal;

a data storage medium for storing the output signal; and means for displaying video associated with a specific person, the means for displaying video associated with the specific person including means for:

searching the data storage medium for a code corresponding to the specific person; and     upon finding the code corresponding to the specific person in the data storage medium:

decrypting, with the second key, the first key used to encrypt a portion of the video signal containing the frames associated with the code corresponding to the specific person;

decrypting, with the decrypted first key, the portion of the video signal containing the frames associated with the code corresponding to the specific person; and         displaying the portion of the video signal containing the frames associated with the code corresponding to the specific person.

6. A system as in claim 5 wherein the means for combining the encrypted video signal, the encrypted second key, and the code corresponding to each identified person into the output signal includes means for:

encrypting the code with a third key, the third key being distinct from the first key so that a user, possessing only the third key but not the first key, can decrypt the code without having the capability to decrypt the video signal; and     including the data encrypted with the third key in the output signal in place of the unencrypted code.

\* \* \* \* \*